United States Patent [19]

Aoki et al.

[11] 4,109,152
[45] Aug. 22, 1978

[54] X-RAY INTENSIFYING SCREENS

[75] Inventors: Yuji Aoki, Odawara; Keiji Shimiya, Hiratsuka; Norio Miura, Isehara; Etsuo Mori; Yujiro Suzuki, both of Odawara, all of Japan

[73] Assignee: Dai Nippon Toryo Co., Ltd., Osaka, Japan

[21] Appl. No.: 819,043

[22] Filed: Jul. 26, 1977

[30] Foreign Application Priority Data

Aug. 13, 1976 [JP] Japan .................................. 51-96846
Dec. 3, 1976 [JP] Japan .................................. 51-145325

[51] Int. Cl.$^2$ ............................................. G01J 1/58
[52] U.S. Cl. ............................ 250/486; 252/301.4 H; 252/301.4 S
[58] Field of Search ................. 250/483, 486, 213 VT; 252/301.4 H, 301.4 S

[56] References Cited

U.S. PATENT DOCUMENTS

| | | | |
|---|---|---|---|
| 3,693,006 | 9/1972 | Chenot | 252/301.4 H |
| 3,988,252 | 10/1976 | Ferretti | 252/301.4 H |
| 4,011,455 | 3/1977 | Waller et al. | 252/301.4 S |

*Primary Examiner*—Alfred E. Smith
*Assistant Examiner*—B. C. Anderson
*Attorney, Agent, or Firm*—Gerald J. Ferguson, Jr.; Joseph J. Baker

[57] ABSTRACT

An X-ray intensifying screen having a high speed and capable of providing good image quality superior in sharpness, granularity and contrast comprising a support having formed thereon a fluorescent layer composed of a complex halide phosphor represented by the composition formula shown below and having further formed on the fluorescent layer another fluorescent layer composed of a calcium tungstate phosphor:

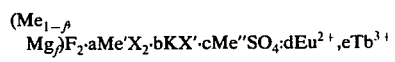

$(Me_{1-p}Mg_p)F_2 \cdot aMe'X_2 \cdot bKX' \cdot cMe''SO_4 : dEu^{2+}, eTb^{3+}$ wherein Me, Me' and Me" each represents at least one of the alkaline earth metals of the group consisting of barium, strontium and calcium; X and X' each represents at least one of chlorine and bromine; and $a, b, c, d, e$ and $f$ are the numbers defined by one of the following five combinations:

1. $0.80 \leq a_1 \leq 1.50$, $0.10 \leq b_1 \leq 1.50$, $c_1 = 0$, $0.001 \leq d_1 \leq 0.20$, $e_1 = 0$ and $f_1 = 0$;
2. $0.30 \leq a_2 \leq 1.50$, $0.10 \leq b_2 \leq 2.00$, $0.01 \leq c_2 \leq 1.00$, $0.001 \leq d_2 \leq 0.20$, $e_2 = 0$ and $f_2 = 0$;
3. $a_3 = 1$, $b_3 = 0$, $c_3 = 0$, $0.01 \leq d_3 \leq 0.10$, $0 < e_3 \leq 0.05$ and $f_3 = 0$;
4. $a_4 = 1$, $b_4 = 0$, $c_4 = 0$, $0.001 \leq d_4 \leq 0.20$, $e_4 = 0$ and $0 < f_4 \leq 1$; and
5. $a_5 = 1$, $0 < b_5 \leq 1.5$, $c_5 = 0$, $0.001 \leq d_5 \leq 0.20$, $e_5 = 0$ and $0 < f_5 \leq 1$.

12 Claims, 8 Drawing Figures

X-RAY INTENSIFYING SCREENS

BACKGROUND OF THE INVENTION

1. Field of the Invention

The present invention relates to a high speed X-ray intensifying screen (hereinafter, the X-ray intensifying screen is referred to as an "intensifying screen") capable of giving good image quality.

2. Description of the Prior Art

In radiography for medical diagnosis etc., intensifying screens are used in combination with X-ray films. At present, in medical diagnosis by radiography, there is a need for a high speed radiographic system (a combination of X-ray film and an intensifying screen) for reducing the patients' dosage of radioactivity. On the other hand, there has also been a need for a radiographic system capable of providing an image quality (i.e., sharpness, granularity and contrast) adaptable for diagnosis by clinical radiography. In other words, there is a need for the development of intensifying screens which have a high speed and at the same time can provide good image qualities superior in sharpness, granularity and contrast.

Hitherto, a calcium tungstate phosphor ($CaWO_4$) has been widely used for intensifying screens. The advantage of intensifying screens using $CaWO_4$ phosphor is their good image quality, an attribute that derives from specific characteristics of $CaWO_4$ phosphor. There are many other phosphors which exhibit higher luminance than that of $CaWO_4$ phosphor under X-ray excitation, such as silver activated zinc sulfide phosphor (ZnS:Ag). However, under the radiographing conditions usually used for medical diagnosis the intensifying screens using phosphors other than $CaWO_4$ phosphor are inferior in image quality, especially in granularity, but they are also generally lower in contrast. Compared with the other two properties, granularity and contrast, the image sharpness is not greatly dependent upon the kind of phosphor used. For example, the sharpness can be improved by reducing the grain size of the phosphor used or reducing the thickness of the fluorescent layer. However, the granularity and contrast depend largely on characteristics specific to the phosphor and the degree of granularity and contrast of the intensifying screen are fundamentally determined by the specific phosphor used.

In his Japanese Patent Application Nos. 75,267/1976; 75,268/1976; 120,895/1976; 120,896/1976; and 123,288/1976, the applicant previously proposed intensifying screens using complex halide phosphors represented by the following composition formula

wherein Me, Me' and Me" each represents at least one of the alkaline earth metals of the group consisting of barium, strontium and calcium; X and X' each represents at least one of chlorine and bromine; and $a$, $b$, $c$, $d$, $e$ and $f$ are numbers defined by one of the following five combinations;

1. $0.80 \leq a_1 \leq 1.50$, $0.10 \leq b_1 \leq 1.50$, $c_1=0$, $0.001 \leq d_1 \leq 0.20$, $e_1=0$ and $f_1=0$;
2. $0.30 \leq a_2 \leq 1.50$, $0.10 \leq b_2 \leq 2.00$, $0.01 \leq c_2 \leq 1.00$, $0.001 \leq d_2 \leq 0.20$, $e_2=0$ and $f_2=0$;
3. $a_3=1$, $b_3=0$, $c_3=0$, $0.01 \leq d_3 \leq 0.10$, $0<e_3 \leq 0.05$ and $f_3=0$;
4. $a_4=1$, $b_4=0$, $c_4=0$, $0.001 \leq d_4 \leq 0.20$, $e_4=0$ and $0<f_4 \leq 1$; and
5. $a_5=1$, $0<b_5 \leq 1.5$, $c_5=0$, $0.001 \leq d_5 \leq 0.20$, $e_5=0$ and $0<f_5 \leq 1$ prepared by activating a complex host material comprising, as the essential constituting components, an alkaline earth metal fluoride and an alkaline earth metal halide (hereafter, the host material of phosphor is referred to as a "complex halide") with divalent europium ($Eu^{2+}$) or divalent europium and trivalent terbium ($Tb^{3+}$), that is, complex halide phosphors including the following five kinds of phosphors represented by the following composition formulae:

1. 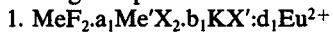

wherein Me and Me' each represents at least one of the alkaline earth metals of the group consisting of barium, strontium and calcium; X and X' each represents chlorine and bromine; and $a_1$, $b_1$ and $d_1$ are numbers meeting the condition of $0.80 \leq a_1 \leq 1.50$, $0.10 \leq b_1 \leq 1.50$ and $0.001 \leq d_1 \leq 0.20$. (Hereinafter called "phosphor-I")

2. 

wherein Me, Me' and Me" each represents at least one of the alkaline earth metals of the group consisting of barium, strontium and calcium; X and X' each represents at least one of chlorine and bromine; and $a_2$, $b_2$, $c_2$ and $d_2$ are numbers meeting the condition of $0.30 \leq a_2 \leq 1.50$, $0.10 \leq b_2 \leq 2.00$, $0.01 \leq c_2 \leq 1.00$ and $0.001 \leq d_2 \leq 0.20$. (Hereinafter called "phosphor-II")

3. 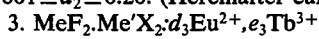

wherein Me and Me' each represents at least one of the alkaline earth metals of the group consisting of barium, strontium and calcium; X represents at least one of chlorine and bromine; $d_3$ and $e_3$ are numbers meeting the condition of $0.01 \leq d_3 \leq 0.10$ and $0<e_3 \leq 0.05$. (Hereinafter called "phosphor-III")

4. 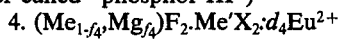

wherein Me and Me' each represents at least one of the alkaline earth metals of the group consisting of barium, strontium and calcium; X represents at least one of chlorine and bromine; and $d_4$ and $f_4$ are the numbers meeting the condition of $0.001 \leq d_4 \leq 0.20$ and $0<f_4 \leq 1$. (Hereinafter called "phosphor-IV")

5. 

wherein Me and Me' each represents at least one of the alkaline earth metals of the group consisting of barium, strontium and calcium; X and X' each represents at least one of chlorine and bromine; and $b_5$, $d_5$ and $f_5$ are numbers meeting the condition of $0<b_5 \leq 1.5$, $0.001 \leq d_5 \leq 0.20$ and $0<f_5 \leq 1$. (Hereinafter called "phosphor-V")

The intensifying screens using the aforesaid complex halide phosphors have a speed or sensitivity which is a few times higher than that of the intensifying screens using the $CaWO_4$ phosphor and a sharpness of the same level as the intensifying screens using the $CaWO_4$ phosphor. However, the intensifying screens using these complex halide phosphors are inferior in granularity and contrast and so improvement in these respects has been desired.

SUMMARY OF THE INVENTION

The object of this invention is to improve the granularity and contrast of the intensifying screens using the aforesaid complex halide phosphors.

In other words, the object of this invention is to provide intensifying screens which have high speed and can provide good image qualities superior in sharpness, granularity and contrast.

As stated above, the granularity and the contrast of intensifying screens are fundamentally determined by the phosphor used. Taking into consideration the fact that intensifying screens using the CaWO₄ phosphor have excellent granularity and contrast, the inventors have studied intensifying screens using a combination of the CaWO₄ phosphor and at least one of phosphor-I, phosphor-II, phosphor-III, phosphor-IV and phosphor-V. As a result, the inventors have discovered that the aforesaid objects of this invention can be achieved by making an intensifying screen structured in a manner where a fluorescent layer composed of the CaWO₄ phosphor is further formed over a fluorescent layer composed of the complex halide phosphor.

This invention thus provides an intensifying screen comprising a support having formed thereon a first fluorescent layer composed of at least one of phosphor-I, phosphor-II, phosphor-III, phosphor-IV and phosphor-V and a second fluorescent layer composed of the CaWO₄ phosphor formed on said first fluorescent layer.

Figure 1A:
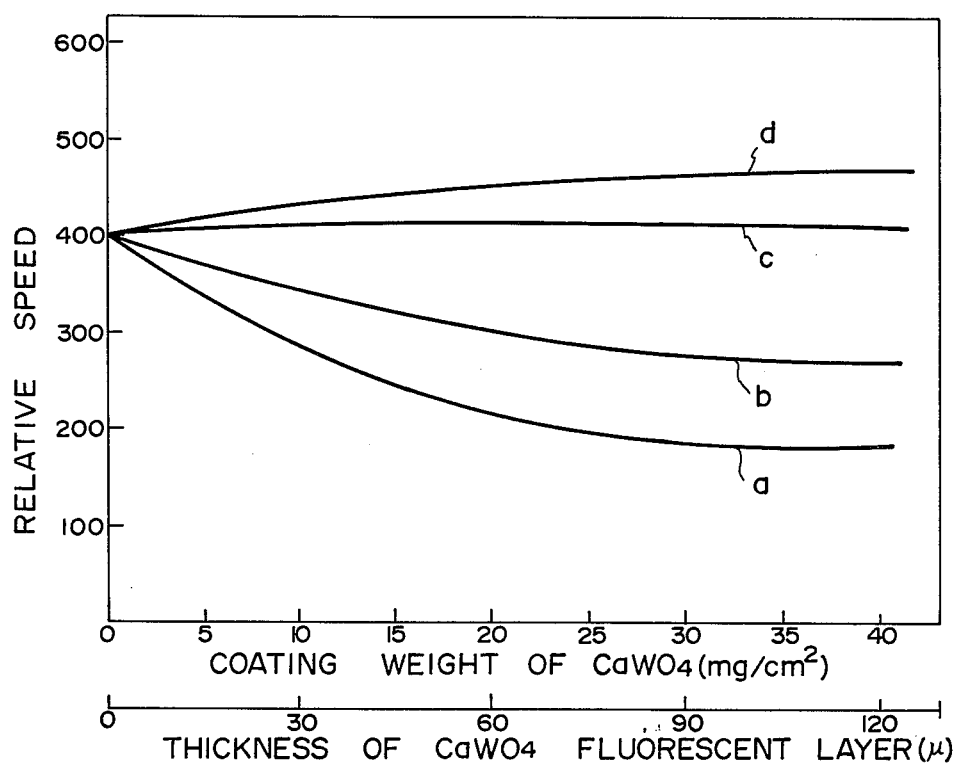
FIGS. 1A and 1B are graphs showing the relation between the speed of the intensifying screens of this invention and the amount of the CaWO₄ phosphor in the CaWO₄ fluorescent layer and between said speed and the thickness of the CaWO₄ fluorescent layer of the intensifying screens.

In all eight graphs, curves $a$, $b$, $c$ and $d$ stand for cases where the mean grain sizes of the CaWO₄ phosphors are 1.0μ, 3.0μ, 6.0μ and 12.0μ, respectively.

DESCRIPTION OF THE PREFERRED EMBODIMENT

Comparison of the granularities of intensifying screens using phosphors exhibiting high luminance under X-ray excitation must be done using intensifying screens having the same speed because the radiographic granularity is caused by both film graininess and screen mottle. Furthermore, the granularity of an intensifying screen includes an X-ray quantum mottle. So in a high speed intensifying screen, reducing the amount of X-ray exposure results in a reduction in X-ray quanta and this reduction in X-ray quanta in turn results in an increase in X-ray quantum mottle. Therefore, in comparing the granularities of the intensifying screens, it is important to compare the granularities of intensifying screens having the same speed in the low speed range in order to remove the influence of the X-ray quantum mottle as thoroughly as possible.

Accordingly, the inventors set out to produce low luminance phosphors with almost the same mean grain size and the same photographic speed as those of phosphors for various intensifying screens, prepared intensifying screens of the same structure and speed using the phosphors, and compared the granularities of the various intensifying screens. The results are shown in Table 1. Moreover, as methods of evaluating the granularities, there are physical measurement methods, such as the measurement of the granularity by the Wiener spectrum or the RMS value, and psychological observation methods, such as the method of pair comparisons. In general, the psychological measurement method is employed for the detection of delicate differences in granularity which are not easily determined by the physical measurement method. In this experiment, the pair comparison method was employed, the granularity of each intensifying screen was evaluated by 10 persons, and the results are shown in the table 1 ranked in order of increasingly desirable granularity.

Table 1

| phosphor | rank |
|---|---|
| CaWO₄ | 1 |
| BaF₂ . BaCl₂ . KCl:Eu²⁺ (phosphor-I) | |
| BaF₂ . BaCl₂ . 1.5KCl . 0.6BaSO₄:Eu²⁺ (phosphor-II) | |
| BaF₂ . BaCl₂:Eu²⁺,Tb³⁺ (phosphor-III) | |
| (Ba₀.₉,Mg₀.₁)F₂ . BaCl₂:Eu²⁺ (phosphor-IV) | 4 |
| (Ba₀.₉₅,Mg₀.₀₅)F₂ . BaCl₂ . 0.01KCl:Eu²⁺ (phosphor-V) | |
| BaFCl:Eu²⁺ | |
| LaOBr:Tb | |
| LaOBr:Tb,Tm | 3 |
| Y₂O₂S:Tb | 5 |
| ZnS:Ag | 6 |
| Gd₂O₂S:Tb | 2 |

As the results in Table 1 show, the granularities of the intensifying screens using phosphor-I, phosphor-II, phosphor-III, phosphor-IV and phosphor-V are almost the same but are not so good, and moreover the intensifying screen using CaWO₄ phosphor has the best granularity.

Then, the inventors made a comparison of the contrast of the various intensifying screens. To do this, intensifying screens were prepared using the aforesaid various phosphors, an acrylic resin plate and a lead plate each having a thickness of 0.1 mm which were disposed adjacent to each of the intensifying screens were radiographed using the intensifying screen, the amount of light at the portions corresponding to the acrylic resin plate disposed portion and the lead plate disposed portion were measured from the photographic densities of the portions, and the contrast (C) was calculated from the following equation:

$$C = \frac{E_{max} - E_{min}}{E_{max} + E_{min}}$$

wherein $E_{max}$: The amount of light at the acrylic resin plate portion.

$E_{min}$: The amount of light at the lead plate portion.

In this case, the X-ray tube voltage was 80KVp. The results of the experiment are shown in Table 2, wherein the contrast value is shown as the relative value when the contrast value of the high sharpness type intensifying screen using the CaWO₄ phosphor (FS, made by Dai Nippon Toryo Co., Ltd.) is defined to be 100.

Table 2

| phosphor | contrast |
|---|---|
| $CaWO_4$ | 100 |
| $BaF_2 \cdot BaCl_2 \cdot KCl:Eu^{2+}$ (phosphor-I) | |
| $BaF_2 \cdot BaCl_2 \cdot 1.5KCl \cdot 0.6BaSO_4:Eu^{2+}$ (phosphor-II) | |
| $BaF_2 \cdot BaCl_2:Eu^{2+},Tb^{3+}$ (phosphor-III) | |
| $(Ba_{0.9},Mg_{0.1})F_2 \cdot BaCl_2:Eu^{2+}$ (phosphor-IV) | 85 |
| $(Ba_{0.95},Mg_{0.05})F_2 \cdot BaCl_2 \cdot 0.01KCl:Eu^{2+}$ (phosphor-V) | |
| $BaFCl:Eu^{2+}$ | |
| $LaOBr:Tb$ | |
| $LaOBr:Tb,Tm$ | 90 |
| $Y_2O_2S:Tb$ | 100 |
| $ZnS:Ag$ | 105 |
| $Gd_2O_2S:Tb$ | 90 |

As is clear from the results shown in Table 2, the intensifying screens using phosphor-I, phosphor-II, phosphor-III, phosphor-IV and phosphor-V were inferior in contrast. Also, the intensifying screen using ZnS:Ag phosphor showed the best contrast and the intensifying screen using $CaWO_4$ phosphor and then that using $Y_2O_2S:Tb$ phosphor followed. In addition, the results shown in Table 2 concern the case where the object was a combination of the acrylic resin plate and the lead plate but when other combinations of objects were used, the ranking order of the contrast was the same as above. Also, the results shown in Table 2 concern the case where the X-ray tube voltage was 80KVp but the order of the contrast ranking was the same as above in the range of X-ray tube voltage (40KVp-120KVp) usually employed in medical diagnosis.

The experimental results on granularity and contrast stated above show that the intensifying screens using phosphor-I, phosphor-II, phosphor-III, phosphor-IV and phosphor-V are inferior and also show the intensifying screen having both good granularity and contrast is the intensifying screen using the $CaWO_4$ phosphor. Thus, it is clear that for improving the granularity and contrast of the intensifying screen using one of phosphor-I, phosphor-II, phosphor-III, phosphor-IV and phosphor-V, it is the best approach to use the complex halide phosphor in combination with the $CaWO_4$ phosphor. According to the inventors' experiments, it has further been confirmed that the improvement of both granularity and contrast of the intensifying screen is impossible when the fluorescent layer of the intensifying screen is formed by a uniform mixture of the complex halide phosphor and the $CaWO_4$ phosphor. That is, the intensifying screen having the fluorescent layer composed of a uniform mixture of the complex halide phosphor and the $CaWO_4$ phosphor has considerably improved contrast as compared with the intensifying screen with a fluorescent layer composed of the complex halide phosphor, but the granularity of the former is same as that of the latter. In other words, both the granularity and the contrast are improved only in the intensifying screen of this invention having a structure where the fluorescent layer composed of the $CaWO_4$ phosphor is formed on the fluorescent layer composed of the complex halide phosphor.

The intensifying screen of this invention can be prepared in the following manner. At least one complex halide phosphor selected from phosphor-I, phosphor-II, phosphor-III, phosphor-IV and phosphor-V is mixed with a proper amount of a binder resin such as nitrocellulose etc., a proper amount of a solvent is added to the mixture to form a coating dispersion of the phosphor having an optimum viscosity, and the coating dispersion thus prepared is applied to a support such as a paper (card board), a plastic sheet etc., by means of a roll coater, a knife coater etc. Some of the known intensifying screens have a structure wherein a reflective layer, an absorptive layer or a metallic foil is formed between the support thereof and the fluorescent layer. In this invention also, if necessary, the intensifying screen may have a reflective layer, an absorptive layer or a metallic foil between the support and the fluorescent layer. In preparing such an intensifying screen, a reflective layer, an absorptive layer or a metallic foil is formed on a support beforehand and then the fluorescent layer of the complex halide phosphor is formed on the layer thus formed in the manner described above. Thereafter, in each of the aforesaid cases, the $CaWO_4$ phosphor is mixed with a proper amount of a binder resin such as nitrocellulose etc., as in the case described above, a proper amount of a solvent is further added to the mixture to form a coating dispersion of the phosphor having an optimum viscosity, and the coating dispersion thus prepared is applied to the fluorescent layer of the complex halide phosphor by means of a roll coater, a knife coater etc., to form the fluorescent layer of the $CaWO_4$ phosphor. In addition, upon the formation of the two fluorescent layers described above, additives, for example, a dispersing agent for improving the dispersibility of the phosphors and a plasticizer such as dibutyl phthalate, methylphthalyl ethyleneglycol, etc., for increasing the plasticity of the intensifying screen obtained may be added to these coating dispersions. After applying the two fluorescent layers to the support as described above, the layers are dried to provide the intensifying screen of this invention.

Many intensifying screens have a transparent protective layer over the fluorescent layer for protecting the fluorescent layer. In the case of the intensifying screens of this invention, it is better to form a transparent protective layer over the $CaWO_4$ fluorescent layer. The protective layer is mainly employed for protecting the fluorescent layer from moisture or water. For this purpose, it is desirable to form the transparent protective layer by using a gas impermeable resin, such as polyvinyl chloride, polyethylene, acrylic resin etc.

From the viewpoint of emission efficiency, even more preferable ranges of the values of $a_1$, $b_1$ and $d_1$ of phosphor-I used in the intensifying screens of this invention are $0.95 \leq a_1 \leq 1.20$, $0.20 \leq b_1 \leq 1.00$ and $0.01 \leq d_1 \leq 0.10$. Similarly, even more preferable ranges of the values of $a_2$, $b_2$, $c_2$ and $d_2$ of phosphor-II are $0.80 \leq a_2 \leq 1.20$, $0.20 \leq b_2 \leq 1.20$, $0.05 \leq c_2 \leq 0.40$ and $0.01 \leq d_2 \leq 0.10$; even more preferable ranges of the values of $d_4$ and $f_4$ of phosphor-IV are $0.01 \leq d_4 \leq 0.10$ and $0 < f_4 \leq 0.5$; and even more preferable ranges of the values of $b_5$, $d_5$ and $f_5$ of phosphor-V are $0.005 \leq b_5 \leq 0.70$, $0.01 \leq d_5 \leq 0.10$ and $0 < f_5 \leq 0.50$.

Also, from the viewpoint of the speed and the sharpness of the intensifying screens obtained, it is preferable to use a complex halide phosphor having a mean grain size of $3\mu$ to $10\mu$ and a standard deviation ($\log \sigma$) below 0.60. An even more preferable mean grain size of the phosphor is $4\mu$ to $6\mu$. Furthermore, from the viewpoint of the speed and the sharpness of the intensifying screens obtained, the coating weight of the complex halide phosphor in the fluorescent layer of the phosphor and the thickness of the fluorescent layer are preferably 5 mg/cm² to 150 mg/cm² and $20\mu$ to $400\mu$, respectively. And even more preferable ranges of the coating weight of the phosphor and thickness of the fluorescent layer are 10 mg/cm² to 80 mg/cm² and 30μ to 300μ, respectively.

For determining various conditions for the CaWO₄ phosphor containing fluorescent layer to be formed on the fluorescent layer of the complex halide phosphor, the inventors prepared various intensifying screens with a constant fluorescent layer of the complex halide phosphor and with varied mean grain sizes of the CaWO₄ phosphors in the fluorescent layers of the CaWO₄ phosphors, varied coating weights of the CaWO₄ phosphors and varied thicknesses of the fluorescent layers and then measured the speeds, the sharpnesses, the granularities and the contrasts of the intensifying screens obtained. The results are shown in FIGS. 1A, 1B, 2A, 2B, 3A, 3B, 4A and 4B.

Figure 1B:
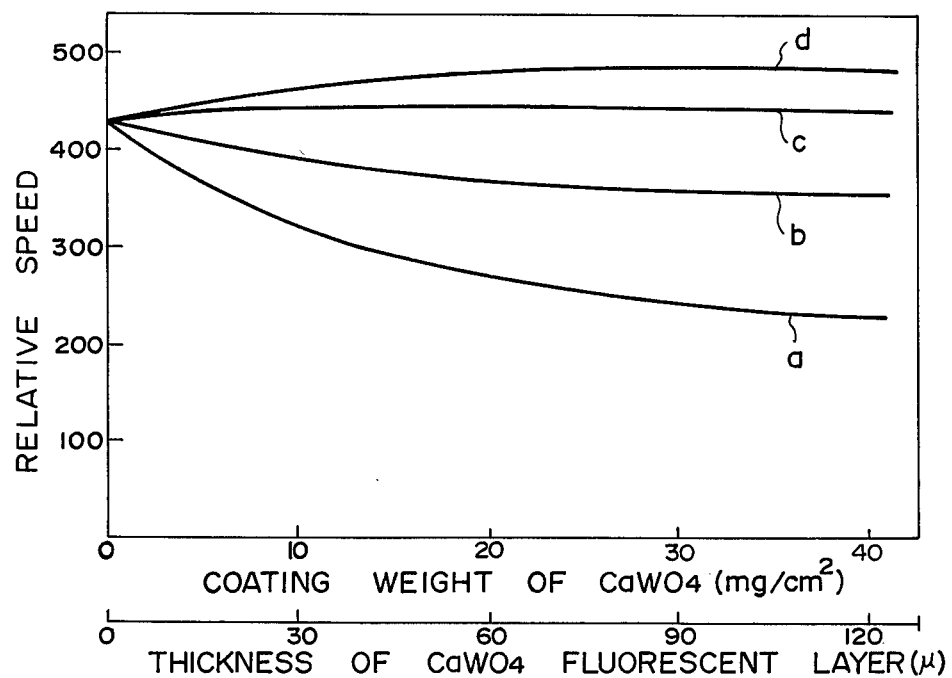
Figure 2A:
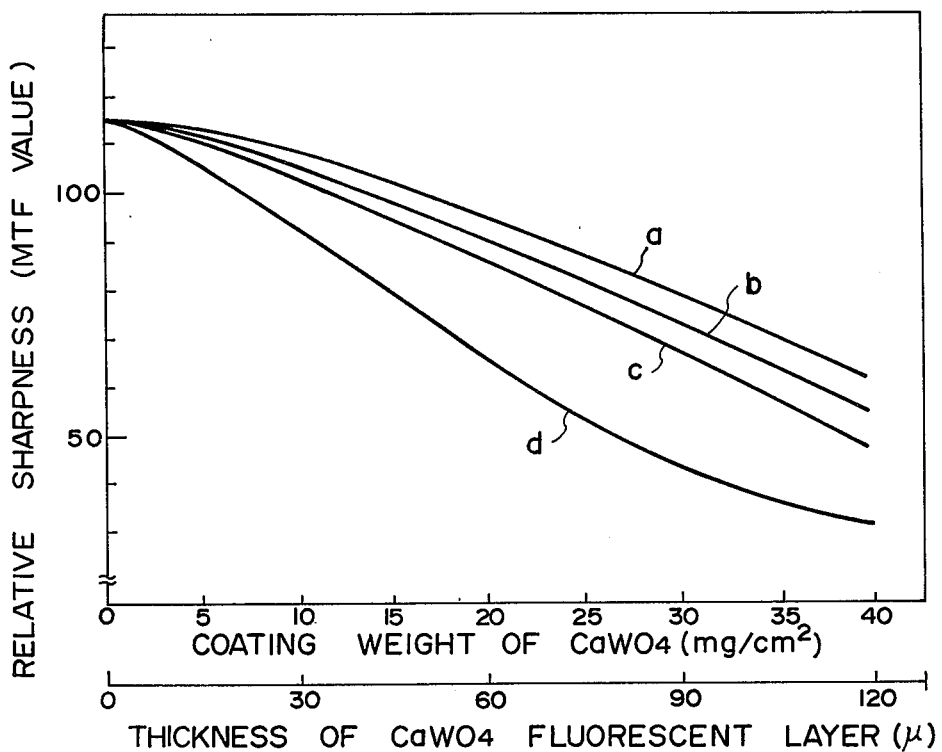
FIGS. 2A and 2B are graphs showing the relation between the sharpness of the intensifying screens of this invention and the amount of the CaWO₄ phosphor in the CaWO₄ fluorescent layer and between said sharpness and the thickness of the CaWO₄ fluorescent layer of the intensifying screens.
Figure 2B:
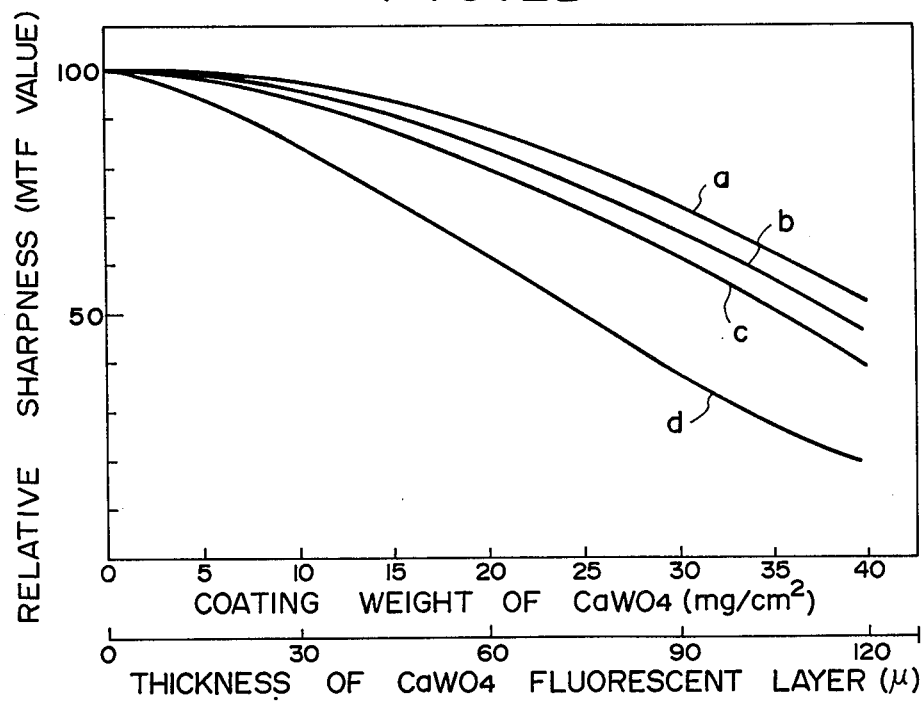
Figure 3A:
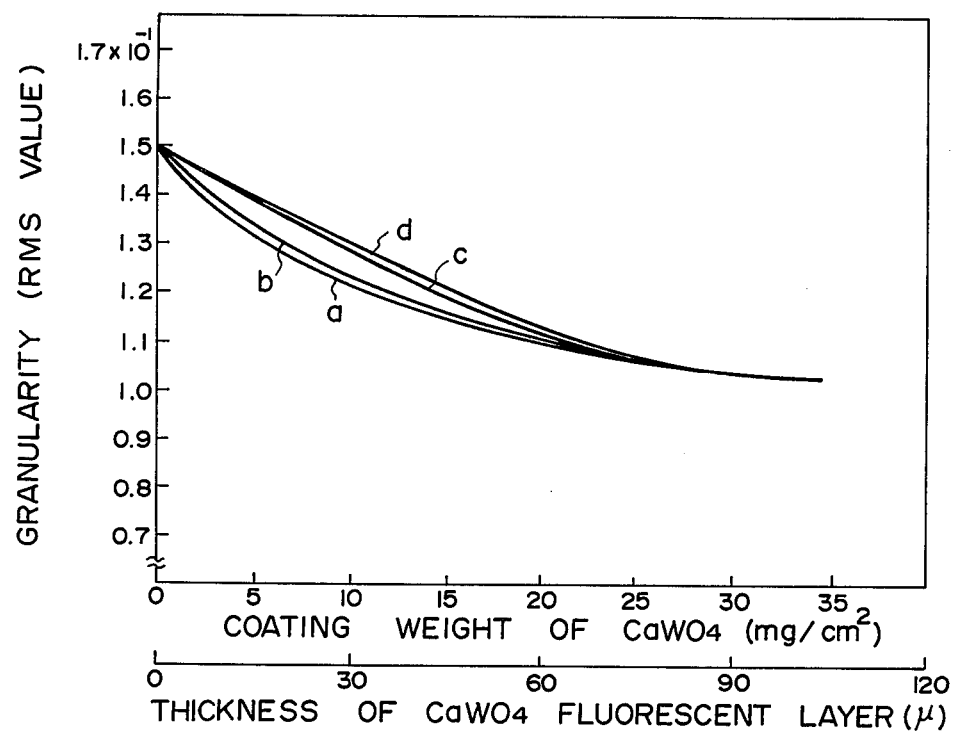
FIGS. 3A and 3B are graphs showing the relation between the granularity of the intensifying screens of this invention and the amount of the CaWO₄ phosphor in the CaWO₄ fluorescent layer and between said granularity and the thickness of the CaWO₄ fluorescent layer of the intensifying screens.
Figure 3B:
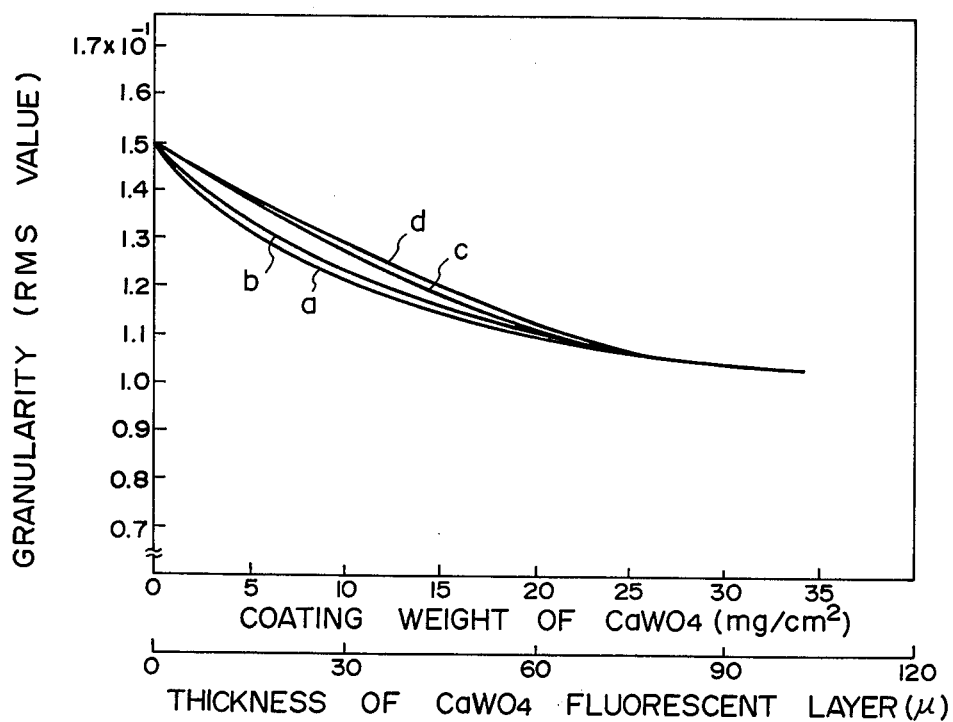
Figure 4A:
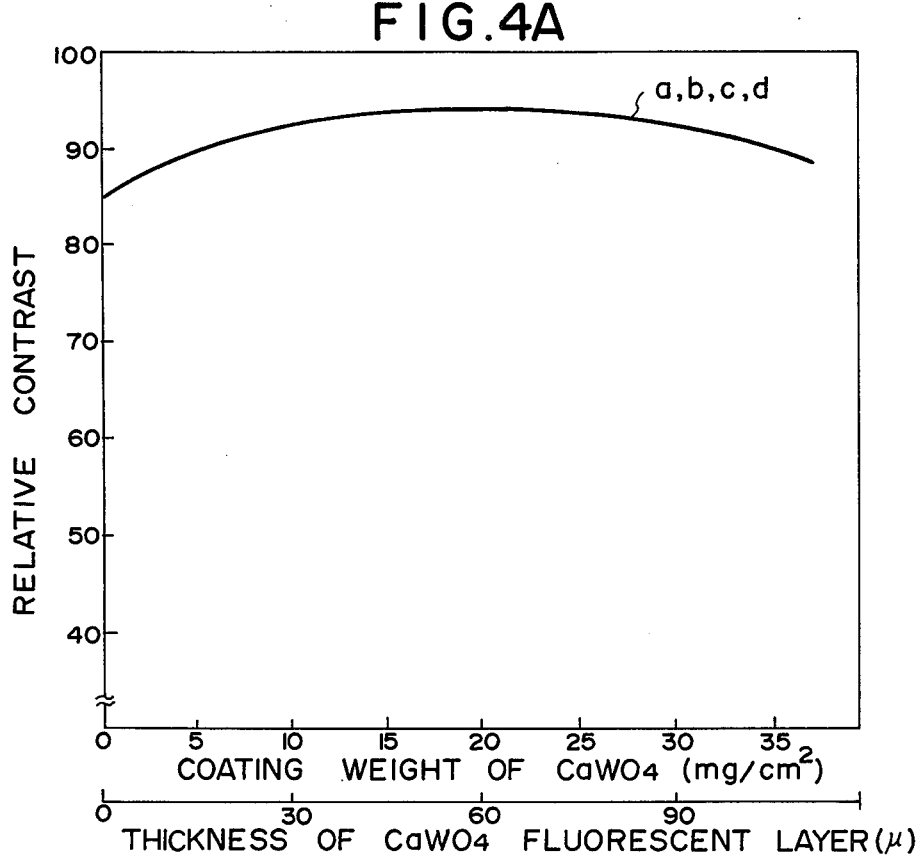
FIGS. 4A and 4B are graphs showing the relation between the contrast of the intensifying screens and the amount of the CaWO₄ phosphor in the CaWO₄ fluorescent layer and between said contrast and the thickness of the CaWO₄ fluorescent layer of the intensifying screens.
Figure 4B:
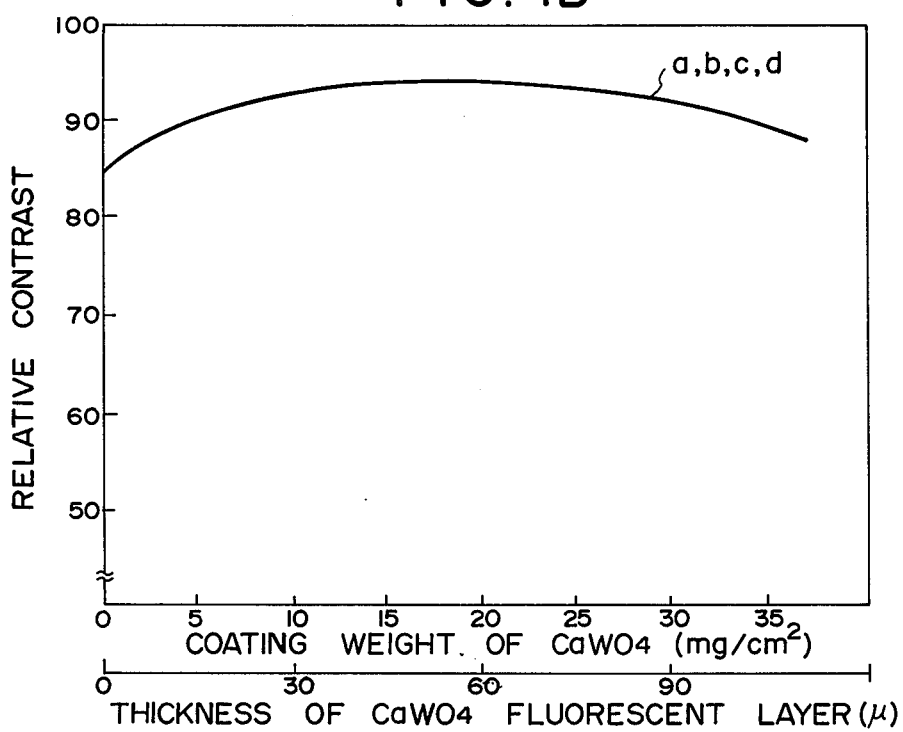

FIGS. 1A and 1B are graphs showing the relation between the speed of the intensifying screens of this invention and the coating weight of CaWO₄ phosphor in the CaWO₄ fluorescent layer and between said speed and the thickness of the CaWO₄ fluorescent layer of the intensifying screens. In these figures, the speed is represented on the ordinate as a relative value based on the speed of the conventional high sharpness type intensifying screen using the CaWO₄ phosphor (aforesaid FS) defined as 100. FIGS. 2A and 2B are graphs showing the relation between the sharpness of the intensifying screens of this invention and coating weight of the CaWO₄ phosphor in the CaWO₄ fluorescent layer and between said sharpness and the thickness of the CaWO₄ fluorescent layer of the intensifying screens. In these figures, the sharpness is represented on the ordinate as a relative value based on the MTF value of the conventional high sharpness type intensifying screen using the CaWO₄ phosphor (FS) defined as 100. FIGS. 3A and 3B are graphs showing the relation between the granularity of the intensifying screens of this invention and the coating weight of the CaWO₄ phosphor in the CaWO₄ fluorescent layer and between said granularity and the thickness of the CaWO₄ fluorescent layer of the intensifying screens. In these figures, the granularity is represented on the ordinate as the RMS value when the film density (D) is 0.8 and the spatial frequency is 0–5 lines/mm. FIGS. 4A and 4B are graphs showing the relation between the contrast of the intensifying screens of this invention and the coating weight of the CaWO₄ phosphor in the CaWO₄ fluorescent layer and between said contrast and the thickness of the CaWO₄ fluorescent layer of the intensifying screens. In these figures, the contrast is represented as a relative value based on the contrast of the conventional high sharpness type intensifying screens using the CaWO₄ phosphor (FS) defined as 100. The method of measuring contrast is the same as in the case of Table 2. In addition, the intensifying screens whose characteristics of are shown in FIGS. 1A, 2A, 3A and 4A were prepared by using the BaF₂.BaCl₂.0.5KCl.0.2BaSO₄:0.06Eu²⁺ phosphor (phosphor-II) having a mean grain size of 5.0μ and a standard deviation (logσ) of 0.40 and the coating weight of the complex halide phosphor in the fluorescent layer of the phosphor and the thickness of the fluorescent layer in these intensifying screens were fixed at 30 mg/cm² and 100μ. The intensifying screens whose characteristics are shown in FIGS. 1B, 2B, 3B and 4B were prepared by using the $(Ba_{0.95}, Mg_{0.05})F_2 \cdot BaCl_2 \cdot 0.01KCl:0.06Eu^{2+}$ phosphor (phosphor-V) having a mean grain size of 4.8μ and a standard deviation (logσ) of 0.38 and the coating weight of the complex halide phosphor in the fluorescent layer of the phosphor and the thickness of the fluorescent layer in these intensifying screens were fixed at 30 mg/cm² and 100μ. In addition, curves a, b, c and d in FIGS. 1A and 1B to FIGS. 4A and 4B stand for the cases where the mean grain sizes of the CaWO₄ phosphors are 1.0μ, 3.0μ, 6.0μ and 12.0μ, respectively (the standard deviation is 0.40 in each case).

From FIGS. 1A and 1B to FIGS. 4A and 4B, it is clear that the intensifying screens of this invention have a high speed and give image quality superior in sharpness, granularity and contrast. Furthermore, as is clear from FIGS. 3A, 3B, 4A and 4B, the grain size of the CaWO₄ phosphor does not have much influence on the granularity and the contrast of the intensifying screens. However, as is clear from FIGS. 1A, 1B, 2A and 2B, the grain size of the CaWO₄ phosphor exerts great influence on the speed and the sharpness of the intensifying screens. That is, when the grain size of the CaWO₄ phosphor is larger, the speed of the intensifying screen increases but the sharpness thereof becomes lower. Conversely, when the grain size of the CaWO₄ phosphor is smaller, the speed of the intensifying screen becomes lower but the sharpness is improved. From the point of mainly the speed and the sharpness, the preferred mean grain size of the CaWO₄ phosphor used in the intensifying screens of this invention is from 1μ to 12μ, more preferably from 3μ to 6μ. In addition, CaWO₄ phosphor having a standard deviation (logσ) below 0.60 is preferably used.

Also, as is clear from FIGS. 1A and 1B to FIGS. 4A and 4B, the coating weight of the CaWO₄ phosphor in the CaWO₄ fluorescent layer and the thickness of the CaWO₄ fluorescent layer influence all features, namely the speed, sharpness, granularity and contrast of the intensifying screens. Thus, from the viewpoint of the speed, sharpness, granularity and contrast of the intensifying screens, the preferred coating weight of the CaWO₄ phosphor in the CaWO₄ fluorescent layer and the thickness of the CaWO₄ fluorescent layer are 10 mg/cm² to 30 mg/cm² and 30μ to 90μ, respectively and, more particularly 15 mg/cm² to 25 mg/cm² and 45μ to 75μ, respectively.

Furthermore, as stated before, FIGS. 1A, 2A, 3A and 4A are graphs showing the various characteristics of the intensifying screens each prepared using the BaF₂.BaCl₂.0.5KCl. 0.2BaSO₄:0.06Eu²⁺ phosphor (phosphor-II) having a mean grain size of 5.0μ and a standard deviation (logσ) of 0.40 as the complex halide phosphor and each having a fixed coating amount of the complex halide phosphor in the fluorescent layer of the phosphor and a fixed thickness of the fluorescent layer to 30 mg/cm² and 100μ, respectively, and also FIGS. 1B, 2B, 3B and 4B are graphs showing the various characteristics of the intensifying screens each prepared using the $(Ba_{0.95}, Mg_{0.05})F_2 \cdot BaCl_2 \cdot 0.01KCl: 0.06Eu^{2+}$ phosphor (phosphor-V) having a mean grain size of 4.8μ and a standard deviation (logσ) of 0.38 as the complex halide phosphor and each having a fixed coating weight of the complex halide phosphor in the fluorescent layer of the phosphor and a fixed thickness of the fluorescent layer of 30 mg/cm² and 100μ, respectively. As is clear from the comparison of FIGS. 1A, 1B, 2A, 2B, 3A, 3B, as well as FIGS. 4A and 4B, both types of intensifying screens show similar characteristics. Also, when the phosphors having different mean grain size, standard deviation (logσ) and composition were used, when the coating weight of the complex halide phosphor in the fluorescent layer of the phosphor and also the thickness of the fluorescent layer were changed, or further when other phosphors (e.g., phosphor-I, phosphor-III and phosphor-IV) were used, the same tendencies as in the cases illustrated in FIGS. 1A and 1B to FIGS. 4A and 4B were obtained.

As stated above, the intensifying screens of this invention have improved granularity and contrast while keeping the excellent speed and sharpness characteristics of the intensifying screens using the complex halide phosphors disclosed in Japanese Pat. Nos. 75,267/1976; 75,268/1976; 120,895/1976; 120,896/1976; and 123,288/1976 by the same applicant. That is, the intensifying screens of this invention have high speed and an image quality superior in sharpness, granularity and contrast. Hence the intensifying screens of this invention have very high practical and industrial utility.

The invention will now be further explained by the following examples.

EXAMPLE 1

A coating dispersion of phosphor having a viscosity of 50 centistokes was prepared by mixing 8 parts by weight of a $BaF_2.BaCl_2.0.5KCl.0.2BaSO_4:0.06Eu^{2+}$ phosphor (phosphor-II), having a mean grain size of 5.0$\mu$, and a standard deviation of 0.40 and 1 part by weight of nitrocellulose using solvent mixture (a mixture of acetone, ethyl acetate and butyl acetate of 1:1:8 by weight ratio). The coating dispersion was uniformly applied to a 250$\mu$ thick polyethylene terephthalate support having formed thereon a carbon black absorptive layer at a coating weight of 30 mg/cm$^2$ by means of a knife coater to form a fluorescent layer of the complex halide phosphor.

Then, a coating dispersion of phosphor having a viscosity of 50 centistokes was prepared by mixing 8 parts by weight of a CaWO$_4$ phosphor with a mean grain size of 6.0$\mu$ and a standard deviation of 0.40 and 1 part by weight of nitrocellulose using a solvent mixture of the same composition as described above. The coating dispersion was uniformly applied to the aforesaid undried fluorescent layer of the complex halide phosphor at a coating weight of about 20 mg/cm$^2$ by means of a knife coater to form the fluorescent layer of the CaWO$_4$ phosphor and then the fluorescent layers thus formed were dried at 50° C. The thicknesses of the fluorescent layer of the complex halide phosphor and the fluorescent layer of the CaWO$_4$ phosphor after drying were 100$\mu$ and 60$\mu$, respectively. Furthermore, an acrylic resin was uniformly applied to the fluorescent layer of the CaWO$_4$ phosphor followed by drying to form a transparent protective layer about 5$\mu$ thick.

When the intensifying screen thus prepared was used in combination with a regular type X-ray film, its photographic speed was about 4 times higher than that of the conventional high sharpness type intensifying screen using the CaWO$_4$ phosphor (FS). The sharpness of the intensifying screen was 0.78, 0.47 and 0.37 in the MTF values at spatial frequencies of 1.0 line/mm, 2.0 lines/mm and 3.0 lines/mm, respectively. Furthermore, the granularity of the intensifying screen was 1.12×10$^{-1}$ in the RMS value at a photographic density (D) of 0.8 and the spatial frequencies of 0–5 lines/mm. Moreover, the contrast of the intensifying screen was 93% of the contrast of the conventional high sharpness type intensifying screen using the CaWO$_4$ phosphor (FS). In addition, the sharpness, granularity and contrast of the intensifying screen prepared in this example were almost the same as those of the conventional medium type intensifying screen using the CaWO$_4$ phosphor (MS, made by Dai Nippon Toryo Co., Ltd.).

EXAMPLE 2

An intensifying screen was also prepared by following the same procedure as in Example 1 except that a $BaF_2.BaBr_2.0.5KBr.0.6BaSO_4:0.06Eu^{2+}$ phosphor (phosphor-II) having a mean grain size of 4.0$\mu$ and a standard deviation of 0.40. The thicknesses of the fluorescent layer of the complex halide phosphor and the fluorescent layer of the CaWO$_4$ phosphor of the intensifying screen thus prepared were 100$\mu$ and 60$\mu$, respectively, which is the same as those of the intensifying screen in Example 1.

When the intensifying screen was used in combination with a regular type X-ray film, its photographic speed was about 4 times higher than that of the conventional high sharpness type intensifying screen using the CaWO$_4$ phosphor (FS). Also, the sharpness of the intensifying screen was 0.79, 0.48 and 0.38 in the MTF values at the spatial frequencies of 1.0 line/mm, 2.0 lines/mm and 3.0 lines/mm, respectively. Furthermore, the granularity of the intensifying screen was 1.12×10$^{-1}$ in the RMS value at the photographic density (D) of 0.8 and the spatial frequencies of 0–5 lines/mm. Moreover, the contrast of the intensifying screen was 93% of that of the high sharpness type intensifying screen using the CaWO$_4$ phosphor (FS). In addition, the sharpness, granularity and contrast of the intensifying screen were almost the same as those of the conventional medium type intensifying screen using the CaWO$_4$ phosphor (aforesaid MS).

EXAMPLE 3

An intensifying screen was prepared by the same procedure as in Example 1 except that a $BaF_2.BaCl_2.0.5KCl:0.06Eu^{2+}$ phosphor (phosphor-I) having a mean grain size of 4.0$\mu$ and a standard deviation of 0.40 and also a CaWO$_4$ phosphor having a mean grain size of 4.0$\mu$ and a standard deviation of 0.40 of 0.40 were used. The thicknesses of the fluorescent layer of the complex halide phosphor and the fluorescent layer of the CaWO$_4$ phosphor were 100$\mu$ and 60$\mu$, respectively, as were those of the intensifying screen in Example 1.

When the intensifying screen was used in combination with a regular type X-ray film, its photographic speed was about 3.8 times higher than that of the conventional high sharpness type intensifying screen using the CaWO$_4$ phosphor (FS). Also, the sharpness of the intensifying screen was 0.78, 0.48 and 0.38 in the MTF values at the spatial frequencies of 1.0 line/mm, 2.0 lines/mm and 3.0 lines/mm, respectively. Furthermore, the granularity of the intensifying screen was 1.11×10$^{-1}$ in the RMS value at the photographic density (D) of 0.8 and the spatial frequencies of 0–5 lines/mm. Moreover, the contrast of the intensifying screen was 93% of the contrast of the high sharpness type intensifying screen using the CaWO$_4$ phosphor (FS). In addition, the sharpness, granularity and contrast of the intensifying screen were almost the same as those of the conventional medium type intensifying screen using the CaWO$_4$ phosphor (MS).

EXAMPLE 4

An intensifying screen was prepared by following the same procedure as in Example 1 except that a $BaF_2.BaCl_2:0.04Eu^{2+}, 0.002Tb^{3+}$ phosphor (phosphor-III)

having a mean grain size of 5.0μ and a standard deviation of 0.40 and a $CaWO_4$ phosphor having a mean grain size of 4.0μ and a standard deviation of 0.40 were used. The thicknesses of the fluorescent layer of the complex halide phosphor and the fluorescent layer of the $CaWO_4$ phosphor were 100μ and 60μ, respectively as were those of the intensifying screen in Example 1.

When the intensifying screen was used in combination with a regular X-ray film, its photographic speed was about 3.8 times higher than that of the conventional high sharpness type intensifying screen using the $CaWO_4$ phosphor (FS). Also, the sharpness of the intensifying screen was 0.76, 0.44 and 0.34 in the MTF values at the spatial frequencies of 1.0 line/mm, 2.0 lines/mm and 3.0 lines/mm, respectively. Furthermore, the granularity of the intensifying screen was $1.13 \times 10^{-1}$ in the RMS value at the photographic density (D) of 0.8 and the spatial frequencies of 0–5 lines/mm. Moreover, the contrast of the intensifying screen was 94% of that of the high sharpness type intensifying screen using the $CaWO_4$ phosphor (FS). In addition, the sharpness, granularity and contrast of the intensifying screen were almost the same as those of the conventional medium type intensifying screen using the $CaWO_4$ phosphor (MS).

EXAMPLE 5

An intensifying screen was prepared by following the same procedure as in Example 1 except that a $(Ba_{0.9},Mg_{0.1})F_2 \cdot BaCl_2:0.06Eu^{2+}$ phosphor (phosphor-IV) having a mean grain size of 5.0μ and a standard deviation of 0.31 was used. The thicknesses of the fluorescent layer of the complex halide phosphor and the fluorescent layer of the $CaWO_4$ phosphor were 100μ and 60μ, respectively as were those of the intensifying screen in Example 1.

When the intensifying screen was used in combination with a regular X-ray film, its photographic speed was about 4.0 times higher than that of the conventional high sharpness type intensifying screen using the $CaWO_4$ phosphor (FS). Also, the sharpness of the intensifying screen was 0.76, 0.44 and 0.33 in the MIF values at the spatial frequencies of 1.0 line/mm, 2.0 lines/mm and 3.0 lines/mm, respectively. Furthermore, the granularity of the intensifying screen was $1.12 \times 10^{-1}$ in the RMS value at the photographic density (D) of 0.8 and the spatial frequencies of 0–5 lines/mm. Furthermore, the contrast of the intensifying screen was 93% of that of the high sharpness type intensifying screen using the $CaWO_4$ phosphor (FS). In addition, the sharpness, granularity and contrast of the intensifying screen were almost the same as those of the conventional medium type intensifying screen using the $CaWO_4$ phosphor (MS).

EXAMPLE 6

An intensifying screen was prepared by following the same procedure as in Example 1 except that a $(Ba_{0.95},Mg_{0.05})F_2 \cdot BaCl_2:0.01KCl:0.06Eu^{2+}$ phosphor (phosphor-V) having a mean grain size of 4.8μ and a standard deviation of 0.38 and also a $CaWO_4$ phosphor having a mean grain size of 4.0μ and a standard deviation of 0.40 were used. The thickness of the fluorescent layer of the complex halide phosphor and the thickness of the fluorescent layer of the $CaWO_4$ phosphor were 100μ and 60μ, respectively as were those of the intensifying screen in Example 1.

When the intensifying screen was used in combination with a regular type X-ray film, its photographic speed was about 4 times higher than that of the conventional high sharpness type intensifying screen using the $CaWO_4$ phosphor (FS). Also, the sharpness of the intensifying screen was 0.78, 0.47 and 0.38 in the MTF values at the spatial frequencies of 1.0 line/mm, 2.0 lines/mm and 3.0 lines/mm. Furthermore, the granularity thereof was $1.11 \times 10^{-1}$ in the RMS value at the photographic density (D) of 0.8 and the spatial frequencies of 0–5 lines/mm. Still further, the contrast of the intensifying screen was 93% of that of the high sharpness type intensifying screen using the $CaWO_4$ phosphor (FS). In addition, the sharpness, granularity and contrast of the intensifying screen were almost the same as those of the conventional medium type intensifying screen using the $CaWO_4$ phosphor (MS).

EXAMPLE 7

An intensifying screen was prepared by following the same procedure as in Example 1 except that a $(Ba_{0.95},Mg_{0.05})F_2 \cdot BaBr_2:0.03KBr:0.06Eu^{2+}$ phosphor (phosphor-V) having a mean grain size of 4.0μ and a standard deviation of 0.40 and also a $CaWO_4$ phosphor having a mean grain size of 4.0μ and a standard deviation of 0.40 were used. The thicknesses of the fluorescent layer of the complex halide phosphor and the fluorescent layer of the $CaWO_4$ phosphor thereof were 100μ and 60μ, respectively, as were those of the intensifying screen in Example 1.

When the intensifying screen was used in combination with a regular type X-ray film, its photographic speed was about 4 times higher than that of the conventional high sharpness type intensifying screen using the $CaWO_4$ phosphor (FS). Also, the sharpness of the intensifying screen was 0.79, 0.48 and 0.38 in the MTF values at the spatial frequencies of 1.0 line/mm, 2.0 lines/mm and 3.0 lines/mm, respectively. Furthermore, the granularity of the intensifying screen was $1.11 \times 10^{-1}$ in the RMS value at the photographic density (D) of 0.8 and the spatial frequencies of 0–5 lines/mm. Moreover, the contrast of the intensifying screen was 93% of that of the high sharpness type intensifying screen using the $CaWO_4$ phosphor (FS). In addition, the sharpness, granularity and contrast of the intensifying screen were almost the same as those of the conventional medium type intensifying screen using the $CaWO_4$ phosphor (MS).

We claim:

1. An X-ray intensifying screen comprising a support having formed thereon a first fluorescent layer composed of a complex halide phosphor represented by the formula shown below and further having formed on said first fluorescent layer a second fluorescent layer composed of a calcium tungstate phosphor:

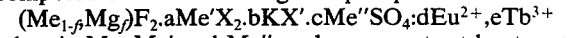

wherein Me, Me' and Me" each represents at least one of the alkaline earth metals of the group consisting of barium, strontium and calcium; X and X' each represents at least one of chlorine and bromine; and $a$, $b$, $c$, $d$, $e$ and $f$ are numbers defined by one of the following five combinations 1. $0.80 \leq a_1 \leq 1.50$, $0.10 \leq b_1 \leq 1.50$, $c_1 = 0$, $0.001 \leq d_1 \leq 0.20$, $e_1 = 0$ and $f_1 = 0$;
2. $0.30 \leq a_2 \leq 1.50$, $0.10 \leq b_2 \leq 2.00$, $0.01 \leq c_2 \leq 1.00$, $0.001 \leq d_2 \leq 0.20$, $e_2 = 0$ and $f_2 = 0$;
3. $a_3 = 1$, $b_3 = 0$, $c_3 = 0$, $0.01 \leq d_3 \leq 0.10$, $0 < e_3 \leq 0.05$ and $f_3 = 0$;

4. $a_4=1$, $b_4=0$, $c_4=0$, $0.001\leq d_4\leq 0.20$, $e_4=0$ and $0<f_4\leq 1$; and 5. $a_5=1$, $0<b_5\leq 1.5$, $c_5=0$, $0.001\leq d_5\leq 0.20$, $e_5=0$ and $0<f_5\leq 1$.

2. The X-ray intensifying screen as claimed in claim 1 wherein the mean grain size of said complex halide phosphor in the fluorescent layer of the phosphor is $3\mu$ to $10\mu$, the coating weight of said complex halide phosphor and the thickness of the fluorescent layer of the complex halide phosphor are 5 mg/cm² to 150 mg/cm² and $20\mu$ to $400\mu$, respectively, the mean grain size of said calcium tungstate phosphor in the fluorescent layer of the phosphor is $1\mu$ to $12\mu$, the coating weight of the calcium tungstate phosphor and the thickness of the fluorescent layer of the phosphor are 10 mg/cm² to 30 mg/cm² and $30\mu$ to $90\mu$, respectively.

3. The X-ray intensifying screen as claimed in claim 2 wherein the mean grain size of the complex halide phosphor in the fluorescent layer of the phosphor is $4\mu$ to $6\mu$, the coating weight of the complex halide phosphor and the thickness of the fluorescent layer of the phosphor are 10 mg/cm² to 80 mg/cm² and $30\mu$ to $300\mu$, respectively, the mean grain size of said calcium tungstate phosphor in the fluorescent layer of the phosphor is $3\mu$ to $6\mu$, and the coating weight of the calcium tungstate phosphor and the thickness of the fluorescent layer of the phosphor are 15 mg/cm² to 25 mg/cm² and $45\mu$ to $75\mu$, respectively.

4. The X-ray intensifying screen as claimed in claim 2 wherein said $a$, $b$, $c$, $d$, $e$ and $f$ are numbers defined by the combination of $0.80\leq a_1\leq 1.50$, $0.10\leq b_1\leq 1.50$, $c_1=0$, $0.001\leq d_1\leq 0.20$, $e_1=0$ and $f_1=0$.

5. The X-ray intensifying screen as claimed in claim 4 wherein said $a_1$, $b_1$ and $d_1$ are numbers meeting the condition of $0.95\leq a_1\leq 1.20$, $0.20\leq b_1\leq 1.00$ and $0.01\leq d_1\leq 0.10$.

6. The X-ray intensifying screen as claimed in claim 2 wherein said $a$, $b$, $c$, $d$, $e$ and $f$ are numbers defined by the combination of $0.30\leq a_2\leq 1.50$, $0.10\leq b_2\leq 2.00$, $0.01\leq c_2\leq 1.00$, $0.001\leq d_2\leq 0.20$, $e_2=0$ and $f_2=0$.

7. The X-ray intensifying screen as claimed in claim 6 wherein said $a_2$, $b_2$, $c_2$ and $d_2$ are numbers meeting the condition of $0.80\leq a_2\leq 1.20$, $0.20\leq b_2\leq 1.20$, $0.05\leq c_2\leq 0.40$ and $0.01\leq d_2\leq 0.10$.

8. The X-ray intensifying screen as claimed in claim 2 wherein said $a$, $b$, $c$, $d$, $e$ and $f$ are numbers defined by the combination of $a_3=1$, $b_3=0$, $c_3=0$, $0.01\leq d_3\leq 0.10$, $0<e_3\leq 0.05$ and $f_3=0$.

9. The X-ray intensifying screen as claimed in claim 2 wherein said $a$, $b$, $d$, $c$, $e$ and $f$ are numbers defined by the combination of $a_4=1$, $b_4=0$, $c_4=0$, $0.001\leq d_4\leq 0.20$, $e_4=0$ and $0<f_4\leq 1$.

10. The X-ray intensifying screen as claimed in claim 9 wherein said $d_4$ and $f_4$ are numbers meeting the condition of $0.01\leq d_4\leq 0.10$ and $0<f_4\leq 0.5$.

11. The X-ray intensifying screen as claimed in claim 2 wherein said $a$, $b$, $c$, $d$, $e$ and $f$ are numbers defined by the combination of $a_5=1$, $0<b_5\leq 1.5$, $c_5=0$, $0.001\leq d_5\leq 0.20$, $e_5=0$ and $0<f_5\leq 1$.

12. The X-ray intensifying screen as claimed in claim 11 wherein said $b_5$, $d_5$ and $f_5$ are numbers meeting the condition of $0.005\leq b_5\leq 0.70$, $0.01\leq d_5\leq 0.10$ and $0<f_5\leq 0.5$.

* * * * *